(12) United States Patent
Ramprashad et al.

(10) Patent No.: US 8,089,970 B2
(45) Date of Patent: Jan. 3, 2012

(54) METHOD AND APPARATUS FOR MANAGING ADMISSION AND ROUTING IN MULTI-HOP 802.11 NETWORKS TAKING INTO CONSIDERATION TRAFFIC SHAPING AT INTERMEDIATE HOPS

(75) Inventors: Sean A. Ramprashad, Los Altos, CA (US); Danjue Li, San Jose, CA (US); Ulas C. Kozat, Santa Clara, CA (US); Christine Pepin, Mountain View, CA (US)

(73) Assignee: NTT DoCoMo, Inc., Tokyo (JP)

( * ) Notice: Subject to any disclaimer, the term of this patent is extended or adjusted under 35 U.S.C. 154(b) by 321 days.

(21) Appl. No.: 11/956,141

(22) Filed: Dec. 13, 2007

(65) Prior Publication Data
US 2008/0144497 A1 Jun. 19, 2008

Related U.S. Application Data

(60) Provisional application No. 60/875,269, filed on Dec. 14, 2006.

(51) Int. Cl.
*H04L 12/28* (2006.01)
*H04L 12/56* (2006.01)
*H04J 1/10* (2006.01)
*H04J 3/08* (2006.01)
*H04B 7/14* (2006.01)
*H04W 4/00* (2009.01)

(52) U.S. Cl. ............... 370/395.53; 370/254; 370/315; 370/328; 370/329; 370/338

(58) Field of Classification Search ............... 370/230, 370/332, 404, 401, 428, 235, 229, 351, 400, 370/395, 412; 455/450; 709/222, 223, 224
See application file for complete search history.

(56) References Cited

U.S. PATENT DOCUMENTS
6,442,135 B1 * 8/2002 Ofek ........................... 370/229
(Continued)

OTHER PUBLICATIONS

V. Kanodia, C. Li, A. Sabharwal, B. Sadeghi, and E. Knightly, "Distributed multi-hop scheduling and medium access with delay and throughput constraints in mind," in Proceedings of ACM MobiCom 2001.
Z. Jiang, L. Chang, and N. K. Shankaranarayanan, "Channel quality dependent scheduling for flexible wireless resource control," in Proceedings of IEEE Globecom 2001.
S. Lee, G.. Narlikar, M. Pal, G. Wilfong, and L. Zhang, "Admission control for multihop wireless backhaul networks with QoS support," in Proceedings of IEEE WCNC 2006, Las Vegas NV, Apr. 2006.

(Continued)

*Primary Examiner* — Robert Scheibel
*Assistant Examiner* — Prenell P Jones
(74) *Attorney, Agent, or Firm* — Haynes & Boone, LLP.

(57) ABSTRACT

A method and a system control admission for voice transmission over a multi-hop network. The method takes multiple parameters into account in order to make a decision and ensures that the system remains stable. The parameters may include options (e.g., aggregation level, bursting level, and transmission rate) and constraints (e.g., the number of users, access points, or sensing range of each user). The method computes the load of the network given each set of options and constraints and compares it against the packetization interval of the voice codec to check whether or not the system is stable. An algorithm of the method finds the best trade-offs between overhead reduction (e.g., due to contention and to packet headers) and a solution robust to channel errors, if links are noisy. If several stable solutions corresponding to different options exist, additional criteria (e.g., the least number of hops, the highest transmission rate) may be used to determine the final "best" solution.

22 Claims, 3 Drawing Sheets

U.S. PATENT DOCUMENTS

| | | | | |
|---|---|---|---|---|
| 6,501,733 | B1 * | 12/2002 | Falco et al. | 370/235 |
| 6,567,378 | B1 * | 5/2003 | Yuan et al. | 370/235 |
| 6,700,869 | B1 * | 3/2004 | Falco et al. | 370/230 |
| 6,963,575 | B1 * | 11/2005 | Sistanizadeh et al. | 370/404 |
| 7,027,449 | B2 * | 4/2006 | Garcia-Luna-Aceves et al. | 370/401 |
| 7,539,175 | B2 * | 5/2009 | White et al. | 370/350 |
| 2002/0067736 | A1 * | 6/2002 | Garcia-Luna-Aceves et al. | 370/442 |
| 2004/0100903 | A1 * | 5/2004 | Han et al. | 370/230 |
| 2004/0246940 | A1 | 12/2004 | Kubler et al. | |
| 2005/0058149 | A1 * | 3/2005 | Howe | 370/428 |
| 2005/0185632 | A1 | 8/2005 | Draves, Jr. et al. | |
| 2005/0286426 | A1 | 12/2005 | Padhye et al. | |
| 2006/0146704 | A1 * | 7/2006 | Ozer et al. | 370/229 |
| 2006/0159033 | A1 | 7/2006 | Suzuki et al. | |
| 2006/0205340 | A1 * | 9/2006 | Cho et al. | 455/11.1 |
| 2006/0215556 | A1 * | 9/2006 | Wu et al. | 370/230 |
| 2006/0239207 | A1 | 10/2006 | Naghian | |
| 2007/0076742 | A1 * | 4/2007 | Du et al. | 370/445 |
| 2007/0091805 | A1 * | 4/2007 | Ramprashad et al. | 370/230.1 |
| 2008/0031188 | A1 * | 2/2008 | Magnusson et al. | 370/329 |
| 2008/0144493 | A1 * | 6/2008 | Yeh | 370/230 |
| 2008/0144497 | A1 * | 6/2008 | Ramprashad et al. | 370/230.1 |
| 2009/0003284 | A1 * | 1/2009 | Chin et al. | 370/332 |
| 2009/0286546 | A1 * | 11/2009 | Hwang et al. | 455/452.2 |

OTHER PUBLICATIONS

D. S. J. De Couto, D. Aguayo, J. Bicket, and R. Morris, "A high-throughput path metric for multi-hop wireless routing," in Proceedings of ACM Mobicom 2003, San Diego CA, Sep. 2003.

D. Li, U. C. Kozat, S. A. Ramprashad, C. Pepin, "Analyzing and Managing Traffic Shaping in the Transmission of Voice over Multi-Hop 802.11 Networks", Draft Journal Paper, Internal to DoCoMo, Aug. 2006.

IEEE Computer Society, "Part 11: Wireless LAN Medium Access Control (MAC) and Physical Layer (PHY) specifications: Higher-speed Physical Layer (PHY) extension in the 5 GHz band}," IEEE Std. 802.11a-1999 R2003.

Document IEEE P802.11e/D13.0, Part II Wireless LAN Medium Access Control (MAC) and Physical Layer (PHY) specifications: Amendment Medium Access Control (MAC) Quality of Service (QoS) Enhancements, IEEE, Jan. 2005.

PCT International Search Report for International Patent Application No. PCT/US2007/087677 dated May 22, 2008, 3 pages.

PCT Written Opinion of the International Searching Authority for International Patent Application No. PCT/US2007/087677 dated May 22, 2008, 3 pages.

* cited by examiner

METHOD AND APPARATUS FOR MANAGING ADMISSION AND ROUTING IN MULTI-HOP 802.11 NETWORKS TAKING INTO CONSIDERATION TRAFFIC SHAPING AT INTERMEDIATE HOPS

CROSS REFERENCE TO RELATED APPLICATIONS

The present application is related to and claims priority of U.S. provisional patent application, entitled "Method and Apparatus for Managing Admission and Routing in Multi-hop 802.11 Networks Taking into Consideration Traffic Shaping at Intermediate Hops," Ser. No. 60/875,269, filed on Dec. 14, 2006. The disclosure of the provisional patent application is hereby incorporated by reference in its entirety.

BACKGROUND OF THE INVENTION

1. Field of the Invention

The present invention relates generally to data traffic over a multi-hop network. More specifically, the present invention relates to managing admission and routing of data streams transmitted over a multi-hop 802.11 based network (or a similar network) that provides traffic-shaping and rate-adaptation services at each hop.

2. Discussion of the Related Art

A mechanism for both controlling admission and making routing decisions is a desirable tool for efficient network management. In a 802.11 network, such a mechanism determines for each new user which access point to associate with and which route, among the multiple potential routes, traffic and packets associated with the user should follow to reach their respective destinations. Such a mechanism may be driven, at least in part, by resource availability (e.g., bandwidth and the number of access points) and the users' Quality-of-Service (QoS) requirements (e.g., transmission rate, throughput, delay, and signal-to-noise ratio). A new user may be denied admission when the required resources are not available, or when user QoS requirements (for both the new user and existing users) would not be satisfied if the new user is admitted. For an interactive voice communication application (e.g., "voice over IP" or "VoIP"), the resource and QoS requirements may include transmission throughput, delay and packet loss. Thus, a desirable admission control policy ensures that the network can support a given number of users without violating the QoS constraints, or the limits of the system. In a multi-hop network, the admission control policy should also prevent bottlenecks, and therefore serves to limit the number of users that can be supported.

A number of admission control algorithms have been proposed for a single-hop wireless network. For example, the article "Channel quality dependent scheduling for flexible wireless resource control," by Z. Jiang, L. Chang, and N. K. Shankaranarayanan, published in the Proceedings of IEEE Globecom 2001, discloses a method that optimizes only throughput. The article "Distributed multi-hop scheduling and medium access with delay and throughput constraints in mind," by V. Kanodia, C. Li, A. Sabharwal, B. Sadeghi, and E. Knightly, published in Proceedings of ACM MobiCom 2001, discloses a method that optimizes both the throughput and the delay. For a 802.11-based multi-hop network, the article "Admission control for multihop wireless backhaul networks with QoS support" ("LNPWZ06"), by S. Lee, G. Narlikar, M. Pal, G. Wilfong, and L. Zhang, published in the Proceedings of IEEE WCNC 2006, Las Vegas Nev., April 2006, discloses a method that meets each user's QoS requirements in delays and connection rates.

Other admission control algorithms take into consideration other options, such as aggregation of voice packets at access-points in the scenario of a multi-hop network. Aggregation of voice packets is disclosed, for example, in the article "A Joint Traffic Shaping and Routing Approach to Improve the Performance of 802.11 Mesh Networks" ("WiOpt06"), by C. Pepin, U. Kozat, and S. A. Ramprashad, published in the Proceedings of WiOpt 2006, Apr. 3-7, 2006 and in the U.S. patent application "Method for Improving Capacity in Multi-Hop Wireless Mesh Networks" ("NPA06"), Ser. No. 11/531,384, by S. Ramprashad, C. Pepin, and U. Kozat.

Once a user is admitted into the network, a routing scheme of the system determines proper routing of the user's data packets to their destinations. Routing in a multi-hop wireless network has been extensively discussed in the literature. In earlier wireless routing protocols (e.g., AODV, DSR, DSDP, and TORA), routing is handled independently from the lower layers, with path discovery being performed in a best-effort fashion without regard for system performance or QoS. Such routing algorithms are intended mainly for Mobile Ad Hoc networks (MANETs), where finding a connected path has priority (see, e.g., http://www.ietf.org/html.charters/manet-charter.html).

It is important to note that such methods do not directly consider important issues at the lower layers. Specifically, if a network is such that there are high overheads in handling and transmitting packets at lower communication layers, as is the case of 802.11 networks, a routing protocol that does not take such overheads and lower layers into consideration can lead to poor system performance.

Taking QoS into consideration in path discovery is discussed, for example, in the article "A high-throughput path metric for multi-hop wireless routing," D. S. J. De Couto, D. Aguayo, J. Bicket, and R. Morris, in Proceedings of ACM Mobicom 2003, San Diego Calif., September 2003. That article discusses a method that minimizes the expected total number of transmissions and retransmissions required to successfully deliver a packet. A new metric is devised which incorporates the effects of link loss ratios, asymmetry in the loss ratios in the two directions of each link, and interference among the successive links of a path. The metric is implemented in the DSDV and DSR routing protocols and is shown to provide better performance than a minimum hop-count metric, particularly for paths with two or more hops.

The prior art includes complex approaches that jointly route and schedule packets to satisfy user QoS requirements. Such approaches can be ineffective due to the complexity of the problem. For example, solving the joint scheduling and routing problem to satisfy required connection rates in a multi-hop wireless network is a known NP-complete problem. See, e.g., the LNPWZ06 article discussed above. The prior art approaches are also ineffective because they focus on only one or two parameters at a time (e.g., throughput and delay) for each user independently. Therefore, in general, the resulting solutions cannot easily scale with the increase in users or access points. In fact, as new users join the network, such approaches may even create bottlenecks.

Beyond such general approaches one may consider more carefully the applications being admitted into the system and by doing so be able to improve performance and simplify the optimization problem. For example, for voice applications (e.g., VoIP applications), or media applications in general that generate small packet sized data persistently, many benefits may be achieved using traffic-shaping at intermediate hops as shown in "WiOpt06" and "NPA06". In such a scenario one can directly consider important issues at lower layers such as the Medium Access Control (MAC) and Physical (PHY) layers. Specifically, by carefully selecting lower-layer mechanism such as aggregation and bursting levels at each hop one can reduce the inherent inefficiencies under the 802.11 protocol for voice or similar traffic. With this the number of VoIP calls that may be supported by such a system may increase substantially. Admission and routing control in such a scenario should take into account such lower layer mechanisms.

SUMMARY

According to one embodiment of the present invention, a method and apparatus control admission of data streams over a multi-hop 802.11 network. The admission control method specifically takes into consideration the joint effects of multiple mechanisms, such as traffic-shaping (e.g., aggregation and bursting) and routing or forwarding packets through multiple wireless links or hops. Because an admission decision impacts both the aggregation and bursting capabilities of the system, and thus the behavior of MAC and PHY layers, these MAC/PHY layer factors are considered directly in admission control. Additional considerations may include those for existing mechanisms already in use in the system, such as adapting the physical transmission rate at each hop to channel conditions (e.g., signal-to-noise ratio).

According to one embodiment of the present invention, the method views the nodes (i.e., access points, gateway access points, terminals) and system as a collection of communication groups. A communication group is a set of flows originating from 802.11 nodes that are contending for a common wireless resource. See for example the illustrations in FIGS. 2 and 3 where flows (links) are labeled with a number "n" indicating their group membership. One can also consider such a group to be the interfaces (a MAC and an associated PHY) provided on such nodes that contend among themselves for a common wireless resource. The mechanism admits a user into the network (i.e. select for the user both a suitable access point (AP) and selects a route to the gateway access point (GAP)) in a manner such that the resulting changes in the states of different communication groups in the system achieve both a feasible (i.e., stable) system and desirable performance attributes (e.g., maximizing the number of users that can be supported by the system). Here, the "state" of a communication group includes the implicit or directed states of lower layer mechanisms, such as the aggregation or bursting levels each node in a group will use to transmit traffic.

According to one embodiment of the present invention, when a new user enters the system, an access point is selected for association by the new user. This will be the access point with which the user's terminal communicates into the multi-hop network. Furthermore, a route from that access-point to the GAP is assigned. In some instances, the route may be implicitly assigned upon admission because of a simple network topology. In other instances the system may consider a number of possible routes based on the admission decision. In other situations, it can be that the user terminal is connected to an access-point which is itself a GAP, and thus no route is necessary. Correctly managed under the present invention, admission (and associated parameter settings) leads to system parameter values that achieve a desirable performance level (e.g. maximized efficiency).

Further, according to one aspect of the present invention, a method of the present invention not only takes into account admission and routes as a decision independent of lower layers, but directly takes into account the lower-layer traffic-shaping mechanisms used for transferring packets between access-points. It does do by either effectuating an implicit change in traffic-shaping mechanism used by each node in the system, or by directly changing the traffic-shaping mechanism used by each node in the system. An implicitly directed change would include, for example, eliciting a known deterministic (or average) reaction of the access point to a new flow being routed through it. The admission and route decision defines which access points receive additional traffic, and thus the reaction can be predicted. For example, the system may have access points that implement a rule which aggregates, when possible, one incoming packet from each flow into a common next hop packet, sends the packets in burst transmissions, or performs both, when the flows have the same next-hop access point destination. A directed change specifies how each node should handle incoming flows to aggregate and burst in common transmissions.

In both cases (i.e., implicit and direct changes), the admission and routing decision implies a change in state variables in each communication group. The state variables associated with a communication group may include, for example, an aggregation level (e.g., the number of packets that may be multiplexed together in a larger packet), a bursting level (i.e., the number of packets that can be sent in a transmission burst) and a physical-layer (PHY) transmission rate that are used by the nodes in accessing the common physical medium under contention.

One advantage of the present invention is that desirable traffic-shaping parameters for each communication group are determined at the same time the best admission and routing strategy are determined for each new user.

The present invention does so jointly in providing an admission control method for traffic, e.g. voice transmission, over a multi-hop 802.11 network. The method takes multiple parameters into account in order to make a decision and ensures that the system remains stable. The parameters may include options (e.g., aggregation level, bursting level, and transmission rate) and constraints (e.g., the number of users, access points, or sensing range of each user). The method computes the load of each of the communications groups in the network given each set of options and constraints, as determined by a potential admission and routing decision, and compares it against the wireless resources available to each communication group. Note, a load is calculated for each wireless resource being used by the system, i.e. there is a load calculated for each communication group. In the case of voice, it is convenient to consider a measure of load in terms of the channel occupancy time relative to the packetization interval of the voice codec, i.e. the amount of wireless resources (e.g., time) consumed in each communication group per packetization interval of the voice codecs. This is a convenient measure and time interval in VoIP, as a voice coder produces one packet per packetization interval in each direction of a call. In more general cases, one can consider any interval and the average time the wireless medium of a given communication group is busy during that interval. Even more generally, one can simply consider the long-term average time the wireless medium of a communication group is busy.

For a given option (admission, routing, and traffic shaping option) one then checks the load required to handle the number and type (size, bursting, etc) of packets that would be transferred in each communication group against the available wireless resources. By doing so one can check whether or not the system operates in a stable fashion for the given option. Furthermore, among options that can operate in a stable fashion, the method has a measure of load on the system for each communication group. Among these options for stable operation, one can then select an option based on other criteria, e.g., the least number of hops, the highest transmission rate, the lowest load over all communication groups, or the lowest average load.

In investigating options, one can also consider the effects of packet losses, channel impairments, physical layer rates, and adaptation. Such effects are all accounted for in the load calculation. Therefore an option may additionally include, beyond routing, admission, bursting and aggregation, an implicit or direct control of the physical layer data rate used by each transmission in a communication group.

In comparison, prior art admission control methods rely on other considerations and parameters, and often only to decide whether or not a user is admissible. Connection rate and delay are the two most common parameters. Such techniques do not fundamentally consider a system which is additionally optimized by traffic-shaping. The idea of traffic-shaping, as defined and managed in 802.11 multi-hop networks, is unique. Stability and efficiency may be achieved jointly with admission and traffic-shaping.

The present invention is better understood upon consideration of the detailed description below and the accompanying drawings. The present invention is applicable, for example, to a voice-over-IP (VoIP) application on a multi-hop 802.11 network.

DETAILED DESCRIPTION OF THE PREFERRED EMBODIMENTS

Figure 1:
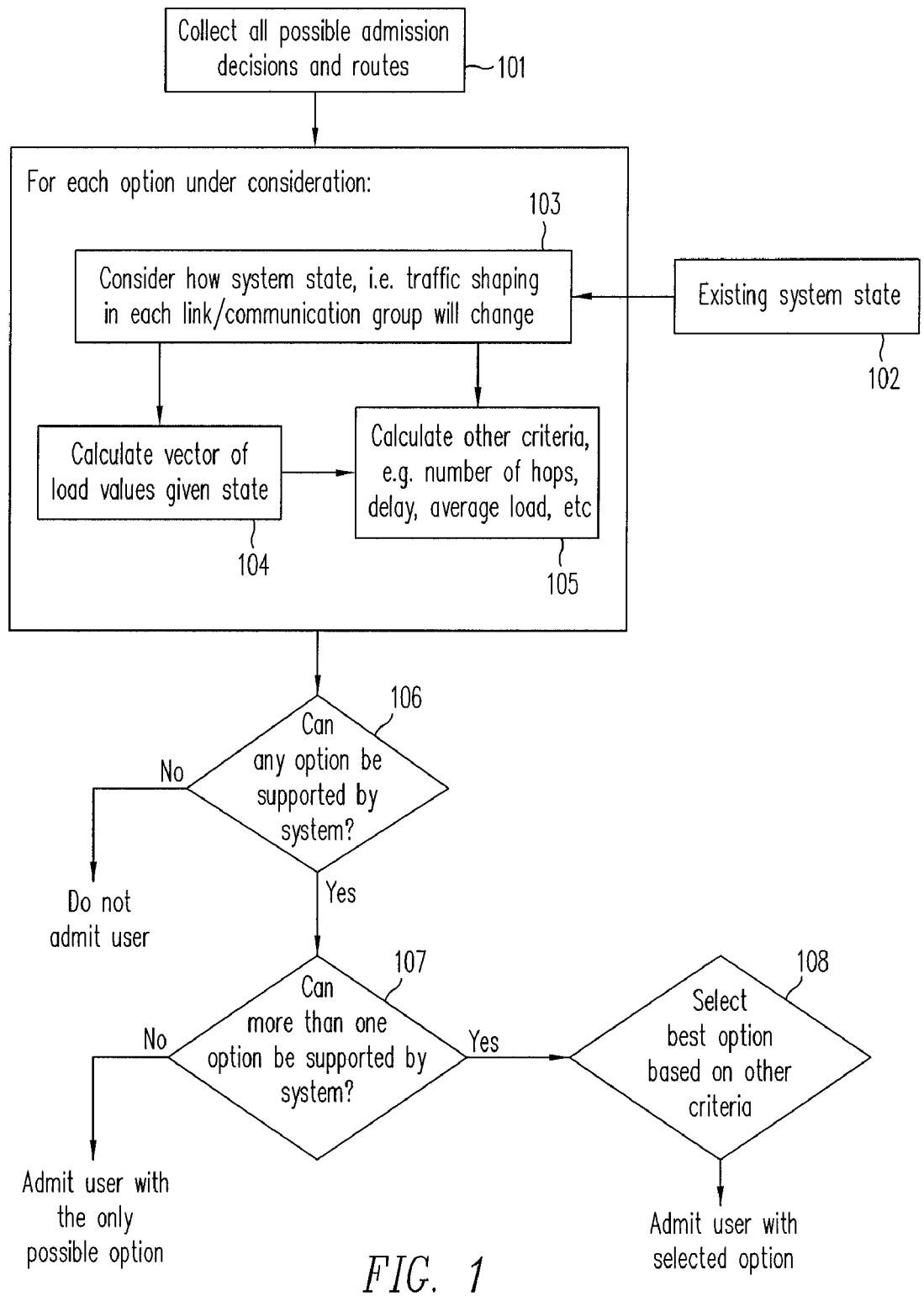
FIG. 1 illustrates a method that takes admission, routing and traffic-shaping into consideration in the process of admitting a new user, in accordance with one embodiment of the present invention.

The present invention provides, in an 802.11-based or similar network, a method to admit and route users. The method routes the user's traffic through multiple-hop wireless links, determines and provides (implicitly or explicitly) traffic-shaping options at one or more of the hops. In certain situations, the admissibility condition is also a stability condition that each communication group has to satisfy for a given set of parameters or options (e.g., aggregation level, bursting level, and connection rates). The solution determines an acceptable set of parameters (more than one solution may exist) and the route and traffic profile across the network, for each user and communication group, without overloading or violating Quality of Service (QoS) constraints imposed for existing and new users.

According to one embodiment of the present invention, a central or "control" entity collects data regarding the state of the network and computes the loads for each communication group as would occur under different potential options. This control entity can exist anywhere in the network; in fact, it may be collocated with or implemented in the GAP. The control entity may collect information from and may take advantage of entities within the network that include automated mechanisms for adaptation (e.g. some communication groups may be able to adapt certain parameters autonomously as mentioned above, based the links they support). One example of such an automated mechanism is the relay access point (RAP) which makes local decisions on aggregation and bursting levels in each of its outbound link, based on corresponding inbound traffic parameters, such as the number and types of inbound users, the number and types of inbound aggregated or burst flows from other RAPs, and the SNRs on different links.

Unlike the prior art, a method under the present invention takes into account multiple parameters (e.g., aggregation level, bursting level, and connection rates) for selectively admitting users. In the detailed description below, "system load" may be determined from calculating the relative channel occupancy time in each communication group. System load may be used as a metric for stability. A stable system results when the communication groups can support the system load. For voice traffic, for example, if the time interval between voice packet generation for each user is x milliseconds, and the time required to transmit all packets generated over the x milliseconds interval is y milliseconds, for all traffic associated with users having links passing through a given communication group, y being greater than x, the system is unstable. The stability condition ensures that the voice packets of all voice calls are serviced in a timely manner, without a long queuing time and without a large packet loss rate (e.g. less than 1%, overall). One can also consider a more aggressive condition for stability, such as the y being less than x by a known gap, i.e. a link budget.

According to one embodiment of the present invention, the stability condition is deemed only a limiting condition. That is, there are many possible admission and routing options that can support a user and enable the system to perform in a stable fashion, providing the required quality of service to all users. A "system load" vector may be provided to adapt the traffic-shaping options under a given admission or routing selection. The system load vector may also be used to indicate unstable communication groups.

One approach to admission that takes into account multiple parameters is disclosed in the article "Analyzing and Managing Traffic Shaping in the Transmission of Voice over Multi-Hop 802.11 Networks" ("LKRP06"), by D. Li, U. C. Kozat, S. A. Ramprashad, C. Pepin, *unpublished DoCoMo Internal Document*, November 2006. This article provides a mathematical description of the load calculation that can be used effectively.

The article under review "An Analysis of Joint Aggregation, Bursting and Rate Adaptation Mechanisms for Increasing VoIP Capacity in Multi-hop 802.11 Networks", S. A. Ramprashad, D. Li, U. C. Kozat, and C. Pepin, under review by IEEE Transactions on Wireless Communications, submitted February 2007, revised October 2007. ("RLKP07") describes the concept in greater detail. In particular this article provides detailed mathematical descriptions of another method of load calculation which accounts for the transmission of packets in greater detail. To provide an in-depth discussion for these load calculation techniques, the LKRP06 and RLKP07 articles are attached herewith as Appendices A and B, and are hereby incorporated by reference in their entireties.

Figure 2:
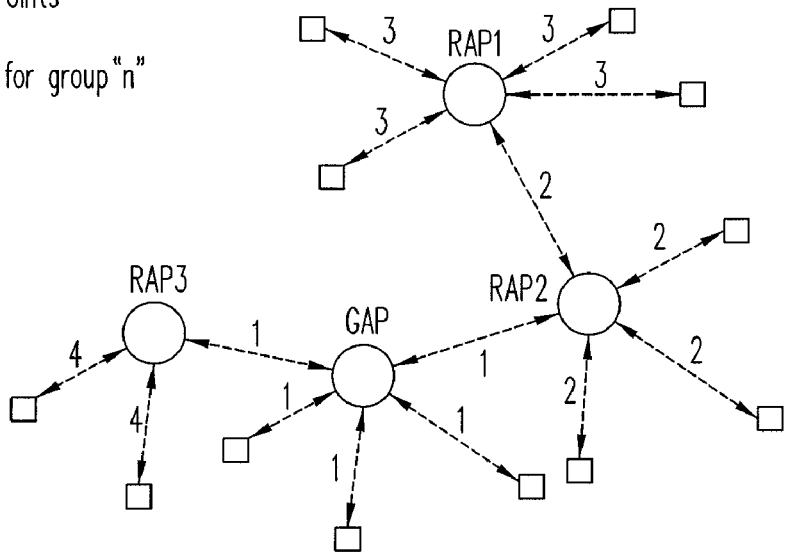
FIG. 2 shows system 200 to which the present invention is applicable.

FIG. 2 shows system 200 to which the present invention is applicable. As shown in FIG. 2, system 200 includes a number of access points, including relay access points (RAP1 to RAP3) and a gateway access point (GAP), thus creating a multi-hop network.

Figure 5:
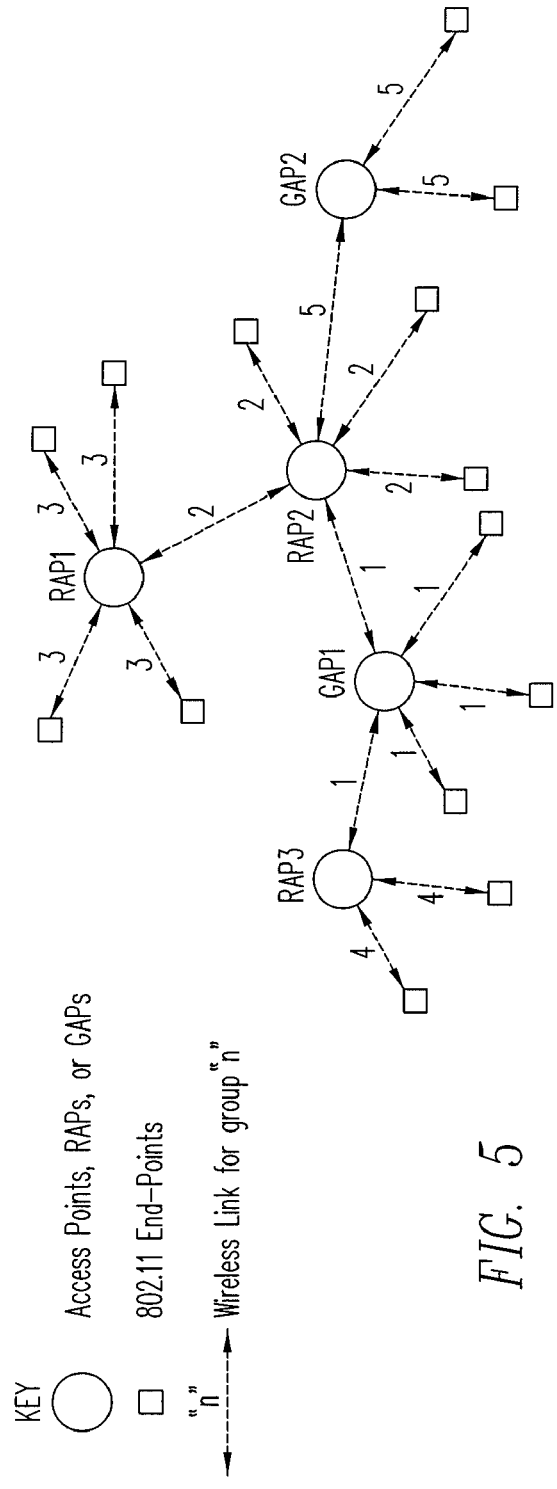
FIG. 5 shows a system with two GAPs which is not tree-rooted and for which the principles also apply).

(Technically, the network of FIG. 2 is a mixed 2-hop and 3-hop tree-rooted network. FIG. 5 shows a system with two GAPs which is not tree-rooted and for which the principles also apply). The GAP provides connectivity to another network (e.g., a wired network). For example, the GAP may be a high-speed wired connection to the Internet. System 200 provides wireless multi-hop paths from mobile terminals to the GAP. Such a system may include multiple GAPs as in FIG. 5. In FIG. 2, the multi-hop network consists of multiple communication groups, with each communication group and its links being labeled by the same reference number (e.g., communication group 1 includes four links associated with the GAP). A communication group may be defined by the radio channel or the radio interfaces shared by the links. The radio channel or interfaces are a common wireless resource that is shared by the associated originating or destination mobile terminals or access points. One example of a wireless resource is an 802.11 channel, or a 802.11 hybrid scheme, such as HCCA. The wireless resource may also consist of different time intervals (e.g., a communication group may be refined to be the distributed contention time-interval or a centralized controlled (Point Coordination Function—PCF mode) interval).

The network supports a number of mobile clients, providing each mobile client a route (i.e., a set of one or more connected links) to at least one GAP. Clients may connect to any one of the four access points RAP1-RAP3 or the GAP. The packets exchanged between the GAP and the mobile client may traverse only one-hop to the GAP (e.g. in FIG. 2 clients that connect directly to the GAP over links labeled "1"), or multiple hops to the GAP. (Although the basic network topology illustrated in this detailed description is a tree-structure, the method of the present invention is applicable to more general network topologies.) As shown in FIG. 2, access points can participate in several communication groups. One implementation provides an access point with different wireless network interface cards that allow them to receive and transmit simultaneously in each group. Alternatively, a single interface card is used with appropriate time-sharing between its use for multiple communication groups.

Figure 3:
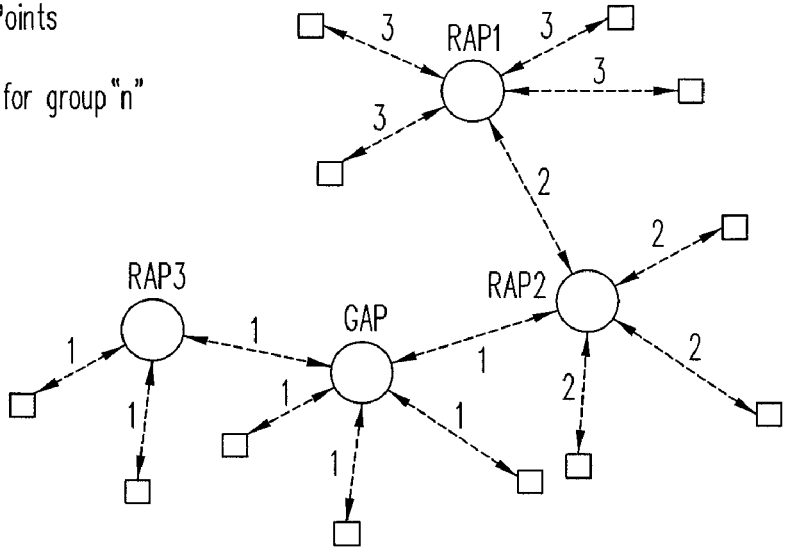
FIG. 3 shows alternative system 300 to which the present invention is applicable.

One may generalize the concept of communication groups to simply links that use the same channel or strongly interfere with each other. For example, FIG. 3 illustrates another allocation of communication groups, in which a relay access point RAP3 uses the same time and channel as the GAP. Such an arrangement results in a system with less performance than the one shown in FIG. 2. However, such an arrangement may be user or preferable when the number of independent available 802.11 channels or time slots in the system is inadequate.

Each communication group may be characterized by the following state variables: (a) the aggregation level used in each of the outbound flows to other terminals, RAPs or GAPs; (b) the bursting level used in each of the outbound flows to other terminals, RAPs or GAPs; (c) the aggregation level used in each of the inbound flows from other terminals, RAPs or GAPs; (d) the bursting level used in each of the inbound flows from other terminals, RAPs or GAPs; (e) the number of mobile terminals directly supported by the APs in the group; (f) the packet generation rate (e.g., in packets/second) and the data rate (e.g., in mega or kilo bits/second) in each flow and from each user; (g) the physical layer data rate of each link or flow; (h) the channel state seen by each flow; and (i) the medium access control (MAC) parameter settings or each MAC mechanism in the group. While this list of parameters is not exhaustive, these parameters may be used to estimate a "load" on each communication group, according to one embodiment of the present invention, as discussed below.

Many of these parameters are traffic-shaping parameters. Other state variables are possible, and include, for example, the present buffer levels at each transmitting terminal or MAC mechanism.

While communication groups are assumed not to interfere with each other in the wireless medium (for the most part), communication groups affect each other through the nature of their respective flows. For example, in FIG. 2, the state of one communication group "4" affects the state of communication group "1". This is because the packets sent to (from) mobiles in group 4 do eventually terminate (originate) at the GAP, and therefore do use the link RAP3←→GAP in group "1". Furthermore, the traffic-shaping options of a first communication group on one RAP or GAP can affect the traffic-shaping options of other communication groups or links involve in forwarding the traffic of the first communication group. For example, the traffic-shaping settings and state of RAP1 applied on its group "2" link to RAP2 affects the QoS in communication group "2". The selected traffic-shaping options may even have an effect on the QoS seen in group "1" since the flow from RAP1→RAP2 eventually flows to the GAP over a group "1" link. Further, in a communication group, traffic-shaping inbound traffic (i.e., the number and the types of packets) can affect traffic-shaping on outbound packets. After all, inbound traffic is collected together for outbound transmissions.

In this detailed description, one focus application is VoIP traffic. Stability with respect to the packetization interval of the voice codec may be used as a performance parameter for an VoIP application. For simplicity, the following model assumes that the network support only VoIP applications and considers stability with respect to the packetization interval. If all users use the same coder and packetization interval, the method of the present invention described below computes a channel occupancy time (i.e., the "load") of each communication group as the expected (or maximum) time to transfer on the links in the communication group one packet per user that uses this group. Typically, a user's route to the GAP may include multiple links and thus involves multiple communication groups.

At each access point (i.e., at the GAP and at each of the RAPs), packets are collected for transmission over the wireless links along the assigned routes. The collected packets to a common destination (over a common link) may be processed as a group in various ways to allow efficient use of the wireless resources. Specifically, an access point may choose between (i) several options of "aggregating" multiple voice or transmission packets into larger single transmission packets and (ii) using a single transmission opportunity (e.g., an opportunity granted after contention in the Carrier Sense Multiple Access-CSMA scheme of 802.11) to "burst" multiple transmission packets over the wireless medium. Using both the common transmission packet payloads and the transmission opportunities efficiently reduces overheads associated with data transmission over the 802.11 wireless interface. As discussed in the WiOPT06, LKRP06 and RLKP07 articles, overheads can consume more than ⅔ of the total available wireless resource, in some instances, leaving ⅓ or less of the wireless resource for actual data transmission. By placing more data in each packet, or by transmitting more packets at each transmission opportunity, the relative overhead per bit of payload information transmitted over an 802.11 link is reduced.

Figure 4:
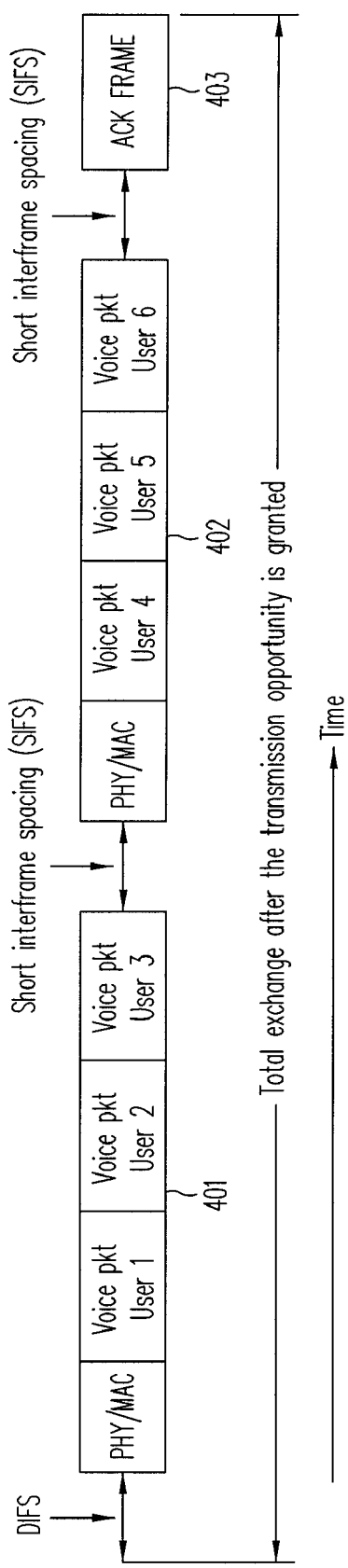
FIG. 4 shows an example of using both aggregation and bursting at a transmission opportunity to improve efficiency.

Given the number and the types of flows supported by a communication group, a combination of system parameters (e.g., "aggregation level", "bursting level", "physical layer rate, and "signal-to-noise ratio on the link") affect the resource utilization efficiency of the wireless resource each communication group has over the wireless medium. For a given communication group, such parameters are given values that result in the best efficiency, or a desired level of efficiency or performance (e.g., delay). FIG. 4 shows an example of using both aggregation and bursting at a transmission opportunity to improve efficiency. As shown in FIG. 4, at a transmission opportunity, a burst of two transmission packets (i.e., packets 401 and 402) and acknowledgement of packet 403, separated from each other by a short interframe spacing (SIFS). Transmission packets 401 and 402 are each formed by aggregating three voice data packets. Here the aggregation level on flow "i" is indicated by "A(i)", and the bursting level by "B(i)" as in LKRP06 and RLKP07. More generally, each packet in a burst transmission may use a different aggregation level. Here, in the mathematical framework below and in the Appendices, we use "A(i,j)" to refer to the aggregation level of the j-th packet in a burst of flow "i", where "j" goes from 1 to B(i). All "A(i,j)" and "B(j)" values can also be statistical quantities.

According to one embodiment of the present invention, when a new user enters the system, an access point is selected for the new user to associate and a route to the GAP is assigned. In some instances, the route may be implicitly assigned upon admission due to the simple topologies. Admission (and associated parameter settings) is correctly managed such that the resulting system parameter values achieve desirable performance (e.g. maximized efficiency). Further, a method of the present invention not only takes into account admission and routes, but also defines (implicitly or explicitly) a traffic-shaping mechanism (e.g., aggregation and bursting level) for transferring packets collected at one access point to the next access point.

FIG. 1 illustrates a method that takes admission, routing and traffic-shaping into consideration in the process of admitting a new user, in accordance with one embodiment of the present invention. At step 101, as each new user (or a group of users) joins the network, the method first collects information regarding possible admission decisions and routes that are to be, or can be, considered for admitting the user into the system. At step 102, the method collects the existing state of the network (e.g., the aggregation levels, the bursting levels, the SNRs, and the number and types of users in each communication group). The admission control algorithm includes primarily the following steps: (i) decompose or note the map of the multi-hop network into communication groups; (ii) compute the load in each communication group for different possible route and traffic-shaping options (steps 103-105); (iii) check the stability condition for each communication group for every possible scenario (step 106); (iv) consider further load attributes if stability is achieved for more than one scenario (step 107); (iv) admit or reject each user to the network, based on the best solution.

In FIG. 1, the search for stable scenarios is conducted by theoretically computing the load vector (vector consisting of load values for each communication group) for each admission and routing scenario. According to one embodiment of the present invention, for each aggregation level, bursting level, transmission rate, and number of users or access points in a communication group, a channel occupancy time is computed for that communication group. Each scenario takes into account the constraints of the multi-hop network. The constraints may include the numbers of access points, users, and current connections, and the sensing range of each user. Setting of proper constraints generally limits the search space. In one embodiment where the users may have several access points in their sensing range and the network allows re-association of the users (without violating the stability condition), then scenarios where users who are already admitted into the network are re-associated to different access points may be investigated.

For each possible admission option, the state of the system may change as result of a new user's admission. In fact, multiple changes may result from each admission option, and multiple admission options exist. For example, the number of users and the types of users in each communication group may change, and a change in one communication group typically leads to a change in another communication group. Such changes follow directly from the fact that the traffic for a new user is carried by the assigned route or routes to and from one of the GAPs, the possible routes based on the admission options considered or selected.

Further, and of significance, a method of the present invention determines how each change in a communication group (e.g., whether directed centrally or as a result of self-adaptation) changes traffic-shaping settings (e.g., aggregation, bursting levels and PHY rate on its links). Traffic shaping has a strong influence on system performance, and admission decisions affect traffic-shaping. The method may have options to re-associate existing users (i.e., changing the APs with which the user are associated and their routes to the GAP) as part of the admission consideration and the change in system state.

For each potential admission option being considered, and the associated joint route and traffic-shaping changes implicit in selecting that option, a new "load" may be computed for each communication group to provide a new network state. These potential "load" measurements can then be used for making admission control decisions and to select between routing options and traffic-shaping options, where many options exist for a given admission option. The computed "load" indicates a relative (fractional) or weighted channel occupancy time for each communication group. For the entire network, the "system load" for a given option may be expressed as a vector of load values, with each value in the vector corresponding to the load for a communication group.

The new "system load" for a given admission, routing and traffic-shaping option may in fact contain load values that show instability in one or more of the communication groups (i.e., the communication groups cannot support the admission option). For example, the load on one or more communication groups exceeds a pre-determined limit for acceptable operation (e.g., a load which exceeds the wireless medium's ability to deliver an acceptable QoS in delay or packet loss). Alternatively, a number of potential admission and routing options may allow all communication groups to operate acceptably. In that situation, the final admission and routing decision among these possibilities may be made based on other criteria, such as the least number of hops, the highest signal-to-noise ratio, minimization of the maximum load over all groups, and load balancing, given the current constraints of the network.

As discussed above, loads are calculated for each communication group. In calculating such loads it is useful to note that there are different types of load components. Some components are incurred per packet transmission, such as 802.11 PHY and MAC headers, while others are incurred per transmission opportunity, such as contention overheads. Still other load components are invariant to how many packets are transmitted, or how many transmission opportunities are used, such as the actual voice (or media) data being transmitted. The former two types of loads are intimately connected with traffic-shaping, since the loads can be amortized, using the techniques of aggregation and bursting, over multiple voice-packets.

Many main system state parameters may be used to calculate a system load value that can then be used in making admission, routing and traffic-shaping decisions. Details of two such calculations can be found in LKRP06 and RLKP07 (attached as Appendices), with LKRP06 providing a simple method, and RLKP07 providing a more detailed method. For example, each inbound or outbound flow "i" in a communication group, one can consider traffic-shaping variables (a) aggregation level A(i) or A(i,j), (b) bursting level B(i), and (c) physical layer data rate PHY(i). Many possible combinations of such parameters may be selected. A particular combination may refer to a particular admission and routing option.

Aggregation level A(i) refers to the number of packets (e.g., voice packets) that are aggregated into a single 802.11-packet in flow i. Bursting level B(i) refers to the number of 802.11-packets that are transmitted per transmission opportunity in flow i. If different aggregation levels are used for different packets in a burst one can use the notation "A(i,j)" as described above to refer to the aggregation level of the "j-th" packet in a burst. PHY(i) refers to physical layer data rate that is used to transmit the i-th flow. Under the 802.11 standard, PHY(i) takes values of 1, 2, 11, . . . , 54 mega-bits-sec (Mbs). To illustrate the use of both aggregation and bursting, FIG. 4 shows a flow in which A(i) and B(i) have values 3 and 2 respectively (here A(i,1)=A(i,2)=3). FIG. 4 also assumes the aggregation includes exactly one voice packet from each user in the communication group. In practice, A(i) is more realistically the effective aggregation level (i.e., some 802.11-packets may contain two or more voice data packets from a single user; but each user provides on the average one voice packet per 802.11-packet).

In this detailed discussion, aggregate level A(i) and bursting level B(i) are assumed the same at every transmission opportunity. Although other values of aggregation level A(i) and bursting value B(i) are possible. B(i) need not be the same at every transmission opportunity. B(i) may be, for example, an average value over many bursts.

Each admission and routing decision includes an assumption regarding a level of data packet traffic that results on each link in each communication group per packetization interval. For example, for VoIP traffic, a 2-way constant bit-rate (or constant packet rate) traffic may be assumed. If one voice packet is generated per call per direction within each frame-interval ("voice-packet-interval"), the number of voice packets transported within that communication group is given by 2×the number of users using links in the communication group. It may also be 4×the number of users using links in the communication group, at a RAP, if inbound and outbound likes use the same group, i.e. where the voice packet appears in both inbound and outbound links in the same wireless interface using the same channel. Of course, the assumption single voice packet per voice-packet-interval per direction is invalid for a variable bit-rate service, or where a single user may use multiple routes. Compensation for the incorrect assumption can be provided in the calculation as needed and described in RLKP07.

In all cases, these models suggest that a load to be borne by the communication group may be associated with each admission and routing decision based on the number of packets (per packetization interval) supported by flows in the communication group. This number defines the possible aggregation and bursting parameter options "A(i)" (or "A(i,j)") and "B(i)" that may be considered for flow "i" in the group. Such parameters may also be implicit on the operation of the nodes in response to the new traffic it sees, as discussed above. An option may consider a joint selection of admission, routing and set of parameter choices for all flows in the communication group. A load for the group can then be calculated. In the following, the parameters A(i), B(i) and PHY(i) are used to illustrate calculating a channel occupancy required to support that load. This calculation is done for all groups affected by the admission and routing possibility (option) being tested. LKRP06 and RLKP07 provide in greater detail the calculation described below.

To do the calculation other application- or scenario-specific parameters may be used. These parameters may include: (i) the number of bits V(i) per voice packet; (ii) packet error rate P(i); and (iii) a statistical description of the probability of successful transmissions p(i,j,m). V(i) refers to the number of bits per voice packet within the i-th flow. As with A(i) and B(i), V(i) may be provided the same fixed value for each user to simplify calculation of the load, although the analysis can be extended to cases where different users generates different bits per voice packet. V(i) may be used to model not only speech data generated by the speech or audio encoder, but also other overhead quantities such as (a) Internet Protocol (IP) header overheads; (b) Real Time Transport (RTP) overheads; User Datagram Protocol (UDP) header overheads, and (d) any other overhead (on average or amortized over users) within the payload of each 802.11 packet. Packet error rate P(i) refers the packet error rate of each transmitted 802.11 packet in the i-th flow, which is a function of V(i), PHY(i), and A(i). See, e.g., the "LKRP06" and "RLKP07" article mentioned above. To transmit a burst of packets may take multiple transmission attempts because of collisions and errors on the wireless medium, which may be accounted for in the calculation. Transmission probability p(i,j,m) refers to the probability that it takes "m" transmit opportunities to transfer the "j" packet in a burst for flow i.

In one embodiment of the present invention, the load (i.e., "channel occupancy time") for each packetization interval consists of three additive parameters: (a) successful transmission time $T_s$; (b) unsuccessful transmission time $T_f$; and (c) the time when nodes are not transmitting but are in contention for the wireless medium, known as the back-off time $T_b$. Successful transmission time $T_s$ refers to the time spent successfully transmitting packets. Unsuccessful transmission time $T_f$ refers to the time wasted due to transmission failures. Back-off time $T_b$ refers to the time spent in back-off mode by each MAC in the communication group.

Successful transmission time $T_s$ includes 3 components: (a) the time spent transmitting voice (or another application payload) bits on each link, (b) the time spent transmitting an acknowledgement (ACK) packet, and (c) additional overhead, such as interframe (IF) spacing. The time spent transmitting an application payload (e.g., voice) is a parameter invariant to the number of successful voice-packets or successful transmission opportunities used to transmit the data. Assuming V(i), A(i), and B(i) are fixed and the same for each user on link i, V(i)×A(i)×B(i) bits are transmitted during each packet-interval (e.g., one voice-packet per user) over the link. The time required to transmit these bits, assuming the same physical layer data rate PHY(I) for each user, is simply V(i)×A(i)×B(i)/PHY(i) in microseconds, if PHY(i) is expressed in mega-bits/second.

The time spent transmitting an ACK packet acknowledging is spent following successful transmissions. In theory, one or more ACK packets may be sent per transmission opportunity to cover all packets burst transmitted during that transmission opportunity. For example, if there are no hidden terminals (i.e. all nodes in a group can sense transmissions from all other nodes) and if there are no other channel impairments resulting in bit or symbol losses, it is shown in LKRP06 and RLKP07 that if the first packet in a burst transmission is successful, then all other packets in the burst are successful. Therefore, for a set of B(i) burst packets on ACK would be used to acknowledge the burst. Assuming that the B(i) burst of 802.11-packets are all part of the same transmission opportunity, one ACK packet is provided for transmission of V(i)× A(i)×B(i) bits. Traffic-shaping via both aggregation (A(i)) and burst processing B(i) amortizes the overhead over multiple voice packets.

Alternatively, one ACK packet may be sent for each 802.11-packet transmitted in a burst. There are two cases in which this can happen. The first case is when the system chooses to do so (this practice may not conform to the 802.11 standard). The second case is when there are channel impairments such as hidden terminals or bit or symbol losses due to noise on the wireless channel. In the second case individual packets in a burst can be lost, terminating the burst transmission and resulting in retransmissions of the lost packets as described in RLKP07. This is where the parameter "p(i,j,m)" helps to describe the average number of ACK packets that are transmitted. For greater detail, see, the RLKP07 article. Also see the 802.11e/D13.0 standard[1], and the 802.11a standard[2] for greater details on the ACK mechanism. Note, in all cases the aggregation mechanism helps to amortize ACK overheads from multiple speech packets by creating a single ACK for an aggregated transmission. Bursting can further amortize ACKs over multiple aggregated packets, depending on the ACK mechanism and channel impairments.

[1] IEEE P802.11e/D13.0, Part II Wireless LAN Medium Access Control (MAC) and Physical Layer (PHY) specifications: Amendment Medium Access Control (MAC) Quality of Service (QoS) Enhancements, IEEE, January 2005
[2] IEEE Computer Society, "Part 11: Wireless LAN Medium Access Control (MAC) and Physical Layer (PHY) specifications: Higher-speed Physical Layer (PHY) extension in the 5 GHz band}," IEEE Std. 802.11a-1999 R2003.

Additional overheads, such as inter-frame spacings (IFS) (e.g. Short IFS (SIFS), the Preamble (PLCP), PHY header, and MAC header, are seen per 802.11—transmitted packet, while others such as some of the Distributed IFS (DIFS)) spacing occur once per transmission opportunity. As with ACKs, these overheads are amortized over many voice packets by the process of aggregation and bursting leading to increased efficiency by these processes. The exact values of these times are defined in the standard. See, e.g., the articles LKRP06 and RLKP07, the 802.11e/D13.0 standard, and the 802.11a standard.

Time wasted due to transmission failures (i.e., time $T_f$) can result from collisions in the transmission medium, or errors in transmitted information due to channel impairments. Failures can happen at each transmission opportunity and for each packet transferred within a burst of transmission. Depending on the channel impairments, aggregation level A(i) can affect the packet loss rate. $T_f$ depends on the number (or expected number) of transmission failures per transmitted burst (i.e., on transmission probability p(i,j,m)). See, e.g., the articles LKRP06 and RLKP07 for a description of how to calculate time $T_f$, and the 802.11e/D13.0 standard and the 802.11a standard, for the overheads relevant to each failure.

In calculating time $T_f$ per transmission attempt, the main time not included is time for ACK packets that are missing from 802.11-packets, or which are not correctly received. Since transmissions lost due to collisions and failures are often a statistical process, time $T_f$ is often given as an expected value, and not an deterministic value as in time $T_s$. See, for example, the LKPR06 and RLKP07 articles. Other ways for calculating a value representative of time $T_f$ includes the distribution of the $T_f$ value, or the probability that time $T_f$ exceeds a predetermined time value.

Time $T_b$ spent in back-off mode by each MAC in the communication group represents the time wasted while the channel is idle, or when MAC mechanisms in the system are in a random back-off state, contending for access to the channel. Time $T_b$ is a central part of the Distributed Coordination Function (DCF) mode under the 802.11 standard, which is based on a Carrier Sense Multiple Access (CSMA) scheme. See, e.g., the descriptions in the 802.11e/D13.0 standard and the 802.11a standard.

The total system load is then estimated by taking into account all links and users, and adding all the individual contributions to the values $T_s$, $T_f$ and $T_b$. Once the totals are known over all traffic within the communication group, the load for the communication group is given by the sum:

$$\text{load} = T_s + T_f + T_b$$

This time-based load may be converted to a relative value. For example, in an VoIP application, when the voice-packet interval is $D_s$, and the load is the time spent transmitting all voice packets generated by users, or transmitted in flows during that interval, a "relative load" may be used, given by:

$$\text{relative load} = (T_s + T_f + T_b)/D_s$$

For stability, the relative load for all communication groups may be either strictly less than, or at times sufficiently less than or equal, to 1. The time load and the relative load values given above for each communication group form a vector of load values for a admission option. If stability is achieved with more than one option, the relative load of each communication group for each option can be used to compare options. For example, the maximum load or the average load estimated across communication groups for each option can be used to compare options. Comparison of options can be refined using other metrics, such as the number of hops of each flow or delays.

The above detailed description is provided to illustrate specific embodiments of the present invention and is not intended to be limiting. Numerous modifications and variations within the scope of the present invention are possible. The present invention is set forth in the accompanying claims.

We claim:

1. A method for associating a user in a multi-hop wireless network comprising one or more relay access points and one or more gateway access points, wherein to transmit in the multi-hop wireless network, an associated entity contends for one or more of a number of wireless resources and transmission opportunities for sending packets to other entities in the wireless network, the method comprising:

within a control entity device associated with the network, identifying a plurality of communication groups in the multi-hop network, each communication group corresponding to a set of wireless terminals, access points, relay access points, and their associated wireless transmissions, which contend for the same wireless resource;

within the control entity, evaluating the effect of associating the user with each communication group, taking into account changes in traffic into and out of relay access points based on the association, including changes in mapping of data packets by relay access points and gateway access points to transmission packets and transmission opportunities that are associated with traffic into and out of relay access points, and changes in channel and time overheads of contention-based access to the wireless resources by members of the communication group; and associating the user with one of the communication groups according to an admission protocol based on the evaluations.

2. A method as in claim 1, wherein the changes in mapping comprises changes in a way the relay access points process and forward their respective incoming and outgoing packets by aggregation of multiple packets into a transmission packet, bursting multiple transmission packets in a transmission opportunity, or both.

3. A method as in claim 2, wherein aggregation and bursting are achieved using statistical or targeted aggregation levels and burst levels, and physical layer data rates.

4. A method as in claim 3, wherein the changes in traffic into and out of the relay access points further takes into account one or more of a targeted packet length, an average time for packet generation, a assumed or expected packet error rate and a probability of transmission within a predetermined number of transmission opportunity.

5. A method as in claim 1, wherein evaluating the effect of associating the user with the communication group comprises calculating a load value.

6. A method as in claim 5, further comprising calculating a metric across the load values of the communication groups.

7. A method as in claim 6, wherein the metric comprises one or more of a maximum load value, an average load value, and a number of hops of routes to a gateway access point.

8. A method as in claim 5, wherein calculating a load value comprises calculating a channel occupancy time.

9. A method as in claim 8, wherein the channel occupancy time comprises a sum of the times incurred for successful transmissions and unsuccessful transmissions.

10. A method as in claim 8, wherein the channel occupancy time further comprises a time for sending acknowledgement packets.

11. A method as in claim 1, wherein the changes in traffic into and out of relay access points further comprises re-associating existing users into communicating groups of the multi-hop network.

12. A method as in claim 1, wherein evaluating the effect of associating the user comprises determining a stability metric of the system as a resulting of admitting the user.

13. A system that associates a user into a multi-hop wireless network with one or more relay access points and one or more gateway access points, wherein to transmit in the multi-hop wireless network, an associated entity contends for one or more of a number of wireless resources and transmission opportunities for sending packets to other entities in the wireless network, the system comprising:
a plurality of communication groups within the multi-hop network each corresponding to a shared resource; and
a control entity configured to evaluate, for each communication group, the effect of associating the user with the communication group, taking into account changes in traffic into and out of relay access points as a result of the association, including changes in mapping of data packets to transmission packets and transmission opportunities for traffic into and out of the relay access points, and time overhead estimated for access contending to the shared resource by members of each communication group, and to associate the new user with one of the communication groups based on the evaluations.

14. A system as in claim 13, wherein changes in the mapping of data packets to transmission packets and transmission opportunities comprise implementing one or more of aggregation levels, burst levels and physical layer data rates.

15. A system as in claim 14, wherein traffic-shaping are carried out according to parameters which include one or more of packet lengths, an average time for packet generation, a packet error rate and a probability of transmission within a predetermined number of transmission opportunity.

16. A system as in claim 13, wherein the control entity is further configured to evaluate the effect of admitting the user by calculating a load value that defines an amount of wireless resources being used to support transmissions after admitting the user.

17. A system as in claim 16, further comprising calculating a metric across the load values of the communication groups.

18. A system as in claim 17, wherein the metric comprises one or more of a maximum load value, an average load value, and a number of hops of routes to a gateway access point.

19. A system as in claim 16, wherein calculating a load value comprises calculating a channel occupancy time.

20. A system as in claim 19, wherein the channel occupancy time comprises a sum of the times incurred for successful transmissions and unsuccessful transmissions.

21. A system as in claim 19, wherein the channel occupancy time further comprises a time for sending acknowledgement packets.

22. A system as in claim 13, wherein changes in traffic into and out of relay access points include re-association of existing users into communicating groups of the multi-hop network.

* * * * *